(12) United States Patent
Lubart et al.

(10) Patent No.: US 7,345,824 B2
(45) Date of Patent: Mar. 18, 2008

(54) LIGHT COLLIMATING DEVICE

(75) Inventors: Neil D. Lubart, Austin, TX (US);
Timothy J. Wojciechowski, Westlake, OH (US); Thomas E. Lash, Shaker Heights, OH (US)

(73) Assignee: Trivium Technologies, Inc., Cleveland, OH (US)

(*) Notice: Subject to any disclaimer, the term of this patent is extended or adjusted under 35 U.S.C. 154(b) by 0 days.

(21) Appl. No.: 11/194,360

(22) Filed: Aug. 1, 2005

(65) Prior Publication Data

US 2005/0259198 A1 Nov. 24, 2005

Related U.S. Application Data

(63) Continuation-in-part of application No. 10/688,785, filed on Oct. 17, 2003, and a continuation-in-part of application No. 10/108,296, filed on Mar. 26, 2002, now abandoned.

(60) Provisional application No. 60/600,272, filed on Aug. 10, 2004.

(51) Int. Cl.
*G02B 27/30* (2006.01)
*G02B 13/18* (2006.01)
*G02B 3/02* (2006.01)

(52) U.S. Cl. .................. 359/641; 359/708; 349/62

(58) Field of Classification Search ............ 359/641, 359/712, 708, 718; 362/559, 268, 335, 338; 349/95, 61, 62
See application file for complete search history.

(56) References Cited

U.S. PATENT DOCUMENTS

| | | | |
|---|---|---|---|
| 3,707,416 A | 12/1972 | Stevens | |
| RE27,617 E | 4/1973 | Olsen | |
| 3,919,559 A | 11/1975 | Stevens | |
| 4,542,449 A | 9/1985 | Whitehead | |
| 5,396,350 A | 3/1995 | Beeson et al. | |
| 5,428,468 A | 6/1995 | Zimmerman et al. | |
| 5,598,281 A | 1/1997 | Zimmerman et al. | |
| 5,839,812 A * | 11/1998 | Ge et al. | 362/607 |
| 5,839,823 A * | 11/1998 | Hou et al. | 362/327 |
| 6,010,747 A | 1/2000 | Beeson et al. | |
| 6,011,601 A | 1/2000 | Kojima | |
| 6,473,220 B1 | 10/2002 | Clikeman et al. | |
| 6,759,113 B1 | 7/2004 | Tang | |
| 6,788,470 B2 * | 9/2004 | Chen et al. | 359/641 |
| 6,819,465 B2 | 11/2004 | Clikeman et al. | |
| 6,903,788 B2 | 6/2005 | Shiraogawa et al. | |
| 6,919,981 B2 | 7/2005 | Clikeman et al. | |
| 2005/0185416 A1 | 8/2005 | Lee et al. | |

* cited by examiner

*Primary Examiner*—Alicia M Harrington
(74) *Attorney, Agent, or Firm*—Pepper Hamilton LLP

(57) ABSTRACT

A collimating device and a transflector for use in a system having a backlight is disclosed herein. In one embodiment of the application, the collimating device and the transflector each include an immersing layer, a reflecting layer, and an optical element layer formed from a plurality of three-dimensional, optical elements. Each optical element is tapered such that a small area end has a horizontal plane cross-sectional area that is less than that of a wide area end. The optical elements of the collimating device are tapered towards the backlight and the optical elements of the transflector are tapered away from the backlight. The reflecting layer has apertures which correspond to the position and shape of the light input ends of the optical elements.

3 Claims, 10 Drawing Sheets

Figure 1A
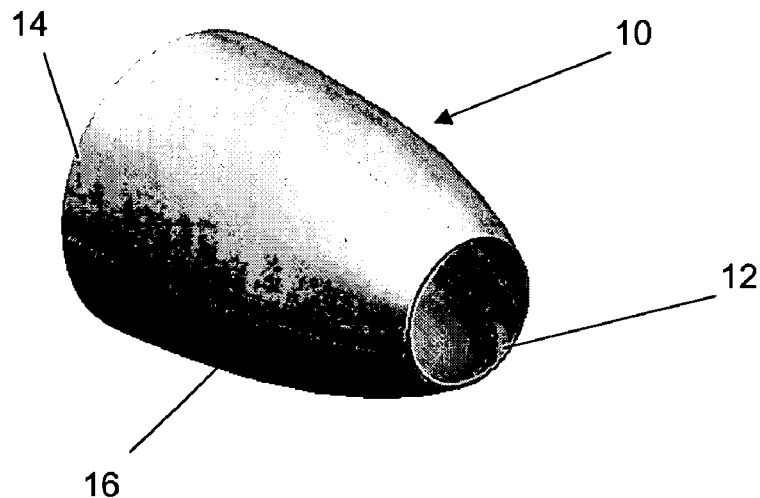
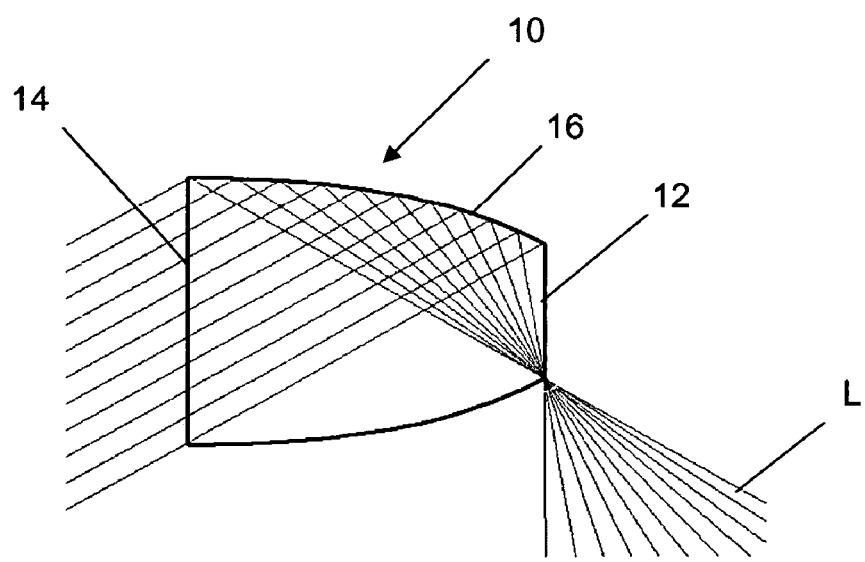
Figure 1B

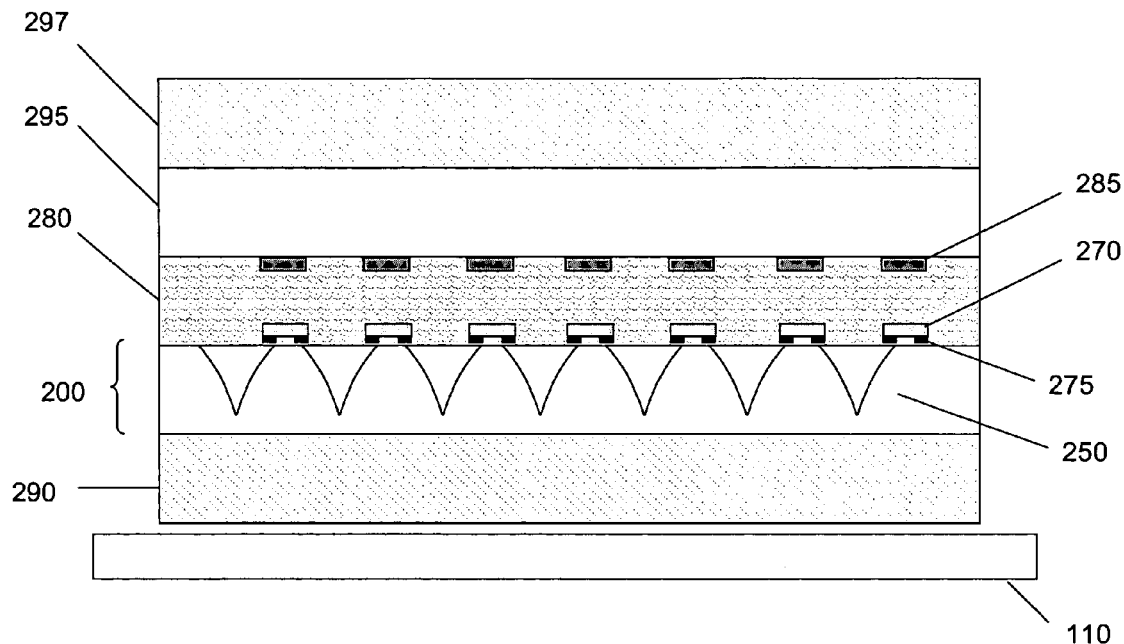
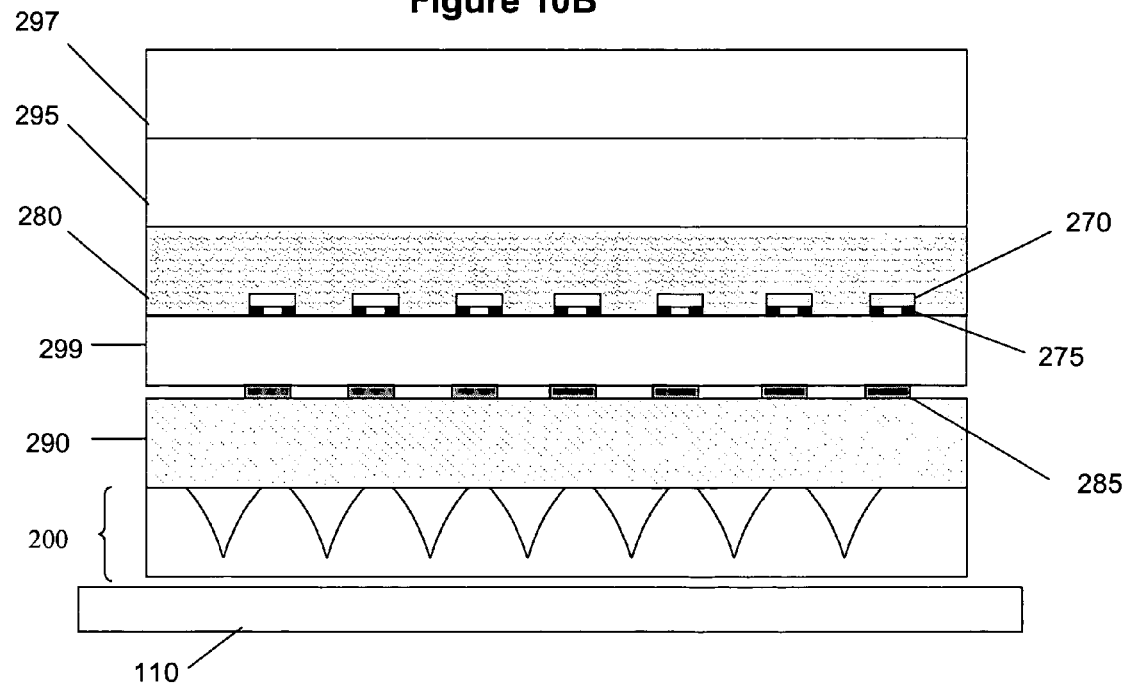

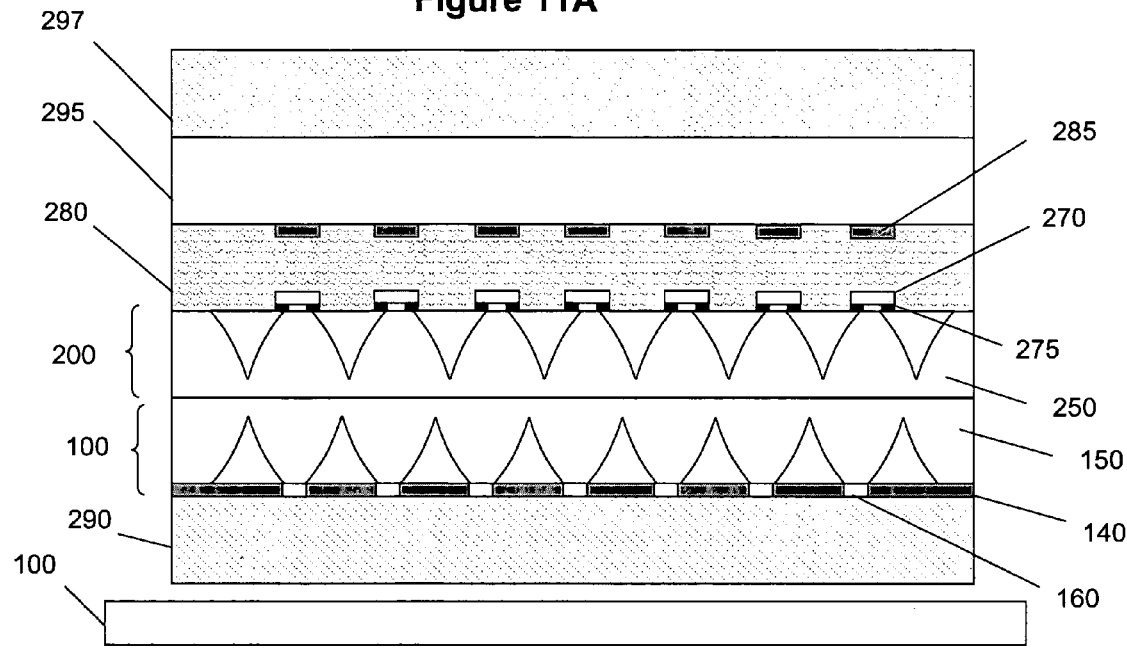
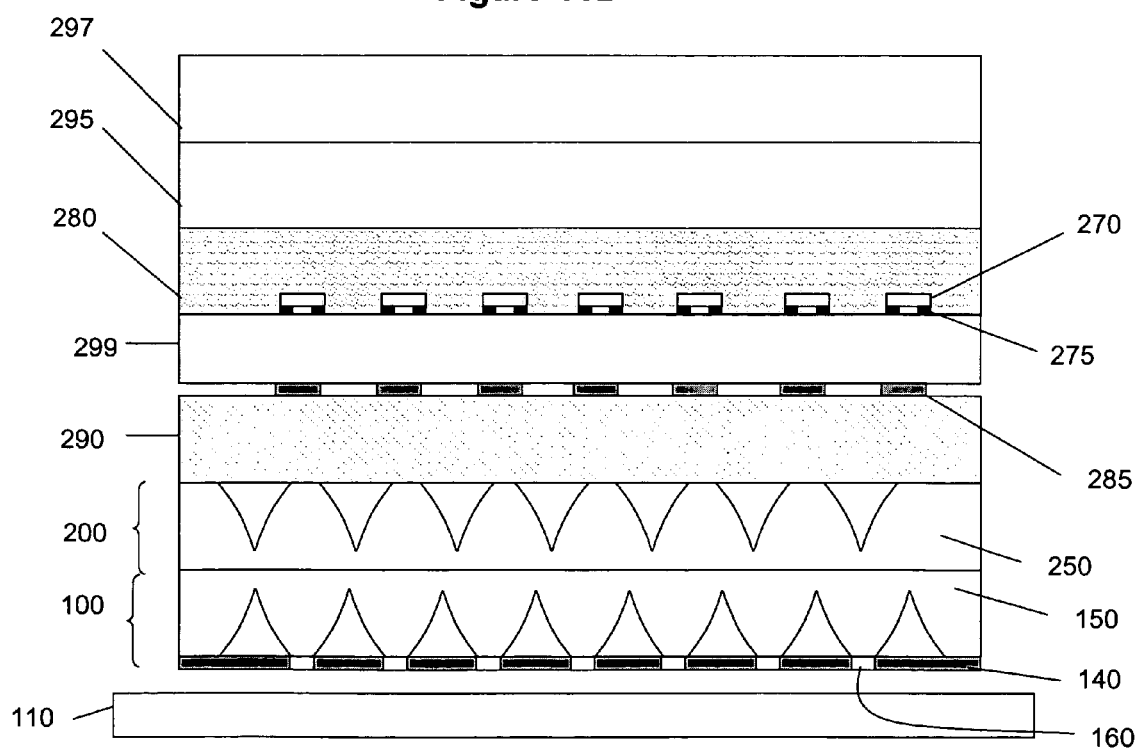

LIGHT COLLIMATING DEVICE

CROSS REFERENCE TO RELATED APPLICATIONS

This application is a continuation-in-part of U.S. application Ser. No. 10/108,296 filed on Mar. 26, 2002, now abandoned. This application is a continuation-in-part of U.S. application Ser. No. 10/688,785 filed on Oct. 17, 2003. This application also claims the benefit of priority of U.S. Provisional Application No. 60/600,272 filed on Aug. 10, 2004.

FIELD OF INVENTION

The present application relates to both (1) transflective structures and (2) light collimating or funneling structures. In particular, the present application relates to both (1) transflective films and (2) light collimating or funneling films.

BACKGROUND

Light collimating films, sometimes known as light control films, are known in the art. Such films typically have opaque plastic louvers lying between strips of clear plastic. U.S. Pat. No. Re 27,617 teaches a process of making such a louvered light collimating film by skiving a billet of alternating layers of plastic having relatively low and relatively high optical densities. After skiving, the high optical density layers provide light collimating louver elements which, as illustrated in the patent, may extend orthogonally to the surface of the resulting louvered plastic film. U.S. Pat. No. 3,707,416 discloses a process whereby the louver elements may be canted with respect to the surface of the light collimating film. U.S. Pat. No. 3,919,559 teaches a process for attaining a gradual change in the angle of cant of successive louver elements.

Such light collimating films have many uses. U.S. Pat. No. 3,791,722 teaches the use of such films in lenses for goggles to be worn where high levels of illumination or glare are encountered. Such films also may be used to cover a backlit instrument panel, such as the dashboard of a car, to prevent undesired reflections in locations such as the windshield, or a backlit electronic device (e.g., a LCD computer screen or LCD TV).

U.S. Pat. No. 5,204,160 discloses light collimating films that are formed from a plastic film with a series of grooves formed therein. The grooves are filled with a light absorbing material or the sides and bottoms of the grooves may be painted with a light absorbing ink.

BRIEF DESCRIPTION OF THE DRAWINGS

In the accompanying drawings, structures are illustrated that, together with the detailed description provided below, describe exemplary embodiments of the claimed invention. It will be appreciated that the illustrated boundaries of the elements in the drawings represent one example of the boundaries.

In the drawings and description that follows, like elements are identified with the same reference numerals. The drawings are not to scale and the proportion of certain elements may be exaggerated for the purpose of illustration.

FIG. 1A is a three-dimensional depiction of one embodiment of an optical element;

FIG. 1B is a depiction of a vertical plane cross-section of one embodiment of an optical element;

FIGS. 10A and 10B are embodiments of a system having transflective pixels 270 and an optical element layer 250 of a transflector 200;

FIGS. 11A and 11B are embodiments of a system having transflective pixels 270, a light collimating device 100, and an optical element layer 250 of a transflector 200.

DETAILED DESCRIPTION

Figure 2A:
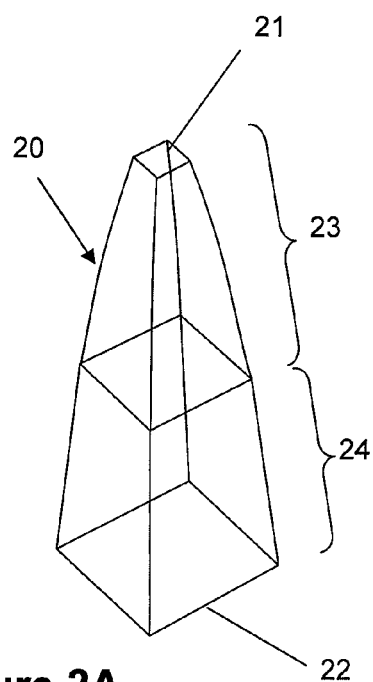
FIGS. 2A, 2B, and 2C are three-dimensional depictions of additional embodiments of optical elements.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Horizontal plane cross-section" as used herein, refers to a cross-section taken along a plane perpendicular to the direction of the element.

"Tapered" as used herein, refers to a narrowing along either a linear or curved line in the vertical plane cross-section direction, such that horizontal plane cross-sections taken at different locations will have different areas. In other words, a tapered object will have a small area end and a large area end.

"Vertical plane cross-section" as used herein, refers to a cross-section taken along a plane parallel to the direction of the element.

The present application relates to both (1) transflective structures and (2) light collimating or funneling structures. Funneling is essentially the action of a funnel. A funnel is typically defined as a conically shaped pipe, employed as a device to channel liquid or fine-grained substances into containers with a small opening. Funnel in this application refers to a general shape only, wherein there is a small end and a large end, with the entire structure not necessarily conical. The funneling of light in the transflective application is essentially from the large end to the small end. The funneling of light in the collimating application is essentially from the small end to the large end.

Light collimation is defined as taking the given angular distribution of a light source and increasing the peak intensity, which may be on-axis, by the process of narrowing that given angular distribution.

Light collimating or funneling effects can be accomplished by using an optical layer formed by a series of discrete tapered optical elements in combination with an immersing layer and a reflecting layer having openings or apertures disposed therein, corresponding to the positioning and shape of the tapered ends of the optical elements. To perform a light collimating or funneling function, the optical element is tapered towards a light source, such that the optical element has a large area end and a small area end. In this manner, the small area ends are light input ends and the large area ends are light output ends.

FIG. 1A illustrates one embodiment of an optical element 10 having a light input end 12, a light output end 14, and an edge 16. In this embodiment, the edge 16 is constrained like a Compound Parabolic Concentrator (CPC). In other words, the vertical plane cross-section of optical element 10 is parabolic or approximately parabolic. In this embodiment the optical element 10 has a circular horizontal plane cross-section. In other embodiments (not shown), the horizontal plane cross-section is square or rectangular.

FIG. 1B illustrates a depiction of a vertical plane cross-section of the same optical element 10. As illustrated, light L enters the optical element 10 at the light input end 12 from multiple directions. As the light L travels through the optical element 10, it impinges on a CPC or parabolic-like sidewall 16. The CPC or parabolic-like sidewall reflects the light L and focuses it an angle such that the light L emerges from the light output end 14 as a substantially uniform sheet.

FIG. 2A illustrates another embodiment of an optical element 20 having a light input end 21, a light output end 22, and a square horizontal plane cross-section. As will be shown in detail below, a square cross-section allows for a higher packing density of optical elements in an optical element array. In alternative embodiments (not shown), the optical element may have a rectangular or any regular polygonal shaped horizontal cross-section that may be regular. In general, regular polygonal cross-sections allow for a higher packing density than circular cross-sections.

With continued reference to FIG. 2A, a CPC structure 23 is located at the light input end 21 and a linear section 24 is located at the light output end 22 of the optical element 20. In another embodiment (not shown), a CPC section similar to that shown in FIG. 1 replaces the combination of the CPC structure 23 and the linear section 24 shown in FIG. 2A.

Figure 2B:
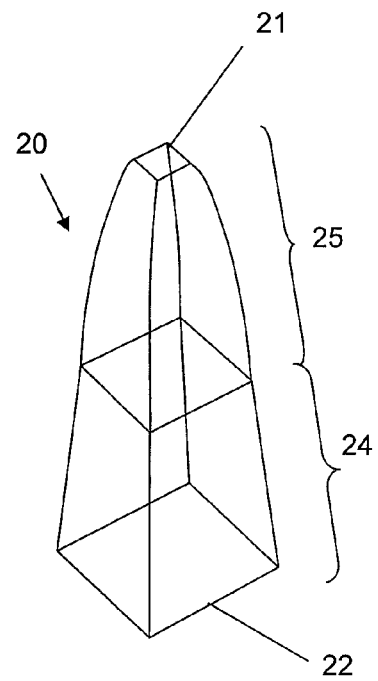

FIG. 2B illustrates an embodiment of an optical element 20 having a light input end 21, a light output end 22, and a square cross-section. In this embodiment, the optical element 20 includes a curved section 25 at the light input end, wherein the curved section 25 is defined by an arc of a circle so as to approximate a CPC. The optical element 20 further includes a linear section 24 located at the light output end 22. In this embodiment, a CPC structure is approximated by matching the slope of the curved section 25 with the slope of the linear section 24 at the intersection point of the curved and linear sections 24, 25.

Figure 2C:
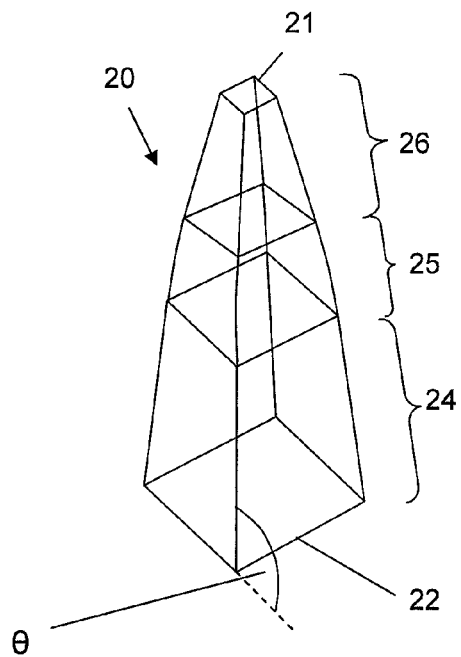

FIG. 2C illustrates another embodiment of an optical element 20 having a square light input end 21 and a square light output end 22. In this embodiment, a first linear section 24 is located at the light output end 22 and a second linear section 26 is located at the light input end 21. A CPC structure 25 is located between the first and second linear sections 24, 26. In an alternative embodiment (not shown), the CPC structure 25 is replaced with a circular approximation of a CPC structure. In either embodiment, a minimum draft angle θ is required for manufacturability. The draft angle is defined as the complement of the angle formed between the light output area 22 and the plane of the linear section 24. In one embodiment, the draft angle is selected such that there is continuity and a continuous slope between sections 24 and 25 and between sections 25 and 26.

Figure 3:
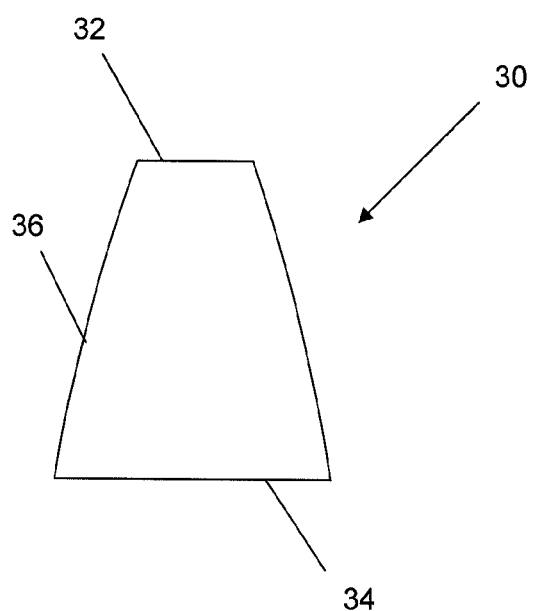
FIG. 3 is a simplified depiction of two adjacent optical elements.

FIG. 3 illustrates a side view, the equivalent of a vertical plane cross section, of one embodiment of an optical element 30 having a square light input end 32 and a square light output end 34. In this embodiment, there are no linear sections. Instead, the sides 36 of the optical element 30 are circular approximations of a CPC structure.

In other embodiments (not shown), the optical elements have any suitable tapered shape including, without limitation, pyramids, cones, or any other three-dimensional polygon or polyhedron. Further, the discrete faces of the optical elements can be planar, concave, convex, or pitted such that light entering the interior of an optical element is controlled, funneled or collimated.

In other embodiments (not shown), the optical elements have intersecting indentations, non-intersecting indentations, cones, conic sections, three-dimensional parabolic structures, pyramids, polygons, polyhedrons (e.g., tetrahedrons), regular multi-sided structures, or irregular multi-sided structures. The reflectance, transmittance, and absorption of the optical elements may have different values. The sides of the structures may be linear, non-linear, or a combination thereof.

An approximation of a CPC shape is easier to manufacture than a true CPC shape, and may maintain, or even improve, peak performance. An arc of a circle is an example of an approximation to the CPC that may improve performance. A CPC structure may be approximated by an arc of a circle or a combination of a linear region on each side of a CPC. The combination of a CPC structure and two linear regions can be approximated by one linear region, but performance may be reduced. In one embodiment, the horizontal plane cross-section can be square or rectangular to allow the structure to be readily manufactured by creating orthogonal lenticular channels. Creating at least two non-orthogonal lenticular channels can produce other cross sections for the collimating structure. The cross sections can also be any regular or irregular polyhedron or any regular or irregular polygon.

A rectangular shaped horizontal plane cross-section (with a corresponding rectangular shaped input end) may result in a collimated light output that is not symmetric. The angular distribution of light output along the length of the rectangular input structure is greater than the angular distribution of light along its width. Increasing the length of the rectangular input structure increases the input area relative to the output area of the element, thus more total energy is available at the output of the element. Therefore, the angular distribution of the output light can be pre-determined based on the display application. The area of the input relative to the output is a design parameter of the device that allows control of the angular distribution of the output light. This can be applied, for example, in a liquid crystal display television (LCD-TV) in which the horizontal direction requires a wider viewing angle than the vertical direction. To satisfy the requirement for a wider viewing angle, the length of the input structure would run in the horizontal direction while the width would run vertically.

In one embodiment, the draft angle may be about 8° or more, thereby yielding a device whose performance may be the same as if the second linear section was extended to define the entire device. In other words, the performance may be as if the first linear section and CPC were removed and replaced by an extension of the second linear section. Such a design would be chosen for ease of manufacturing, although performance is lowered. Smaller draft angles have higher performance, but are more difficult to manufacture because of higher aspect ratio. The aspect ratio is defined as the ratio of the depth of the light-guide to the distance between input apertures. A CPC (or circular fit to a CPC) device allows for the design of a low aspect ratio easy to manufacture device rather than the same performing higher aspect linear device. For example, a linear design with a draft angle of 3.5° (or aspect ratio of close to 8:1) would have about the same performance as a CPC (or circular equivalent) device of aspect ratio about 2.9:1. In other embodiments, the CPC approximation has an aspect ratio range of less than 1:1 to greater than about 7.5:1.

Figure 4:
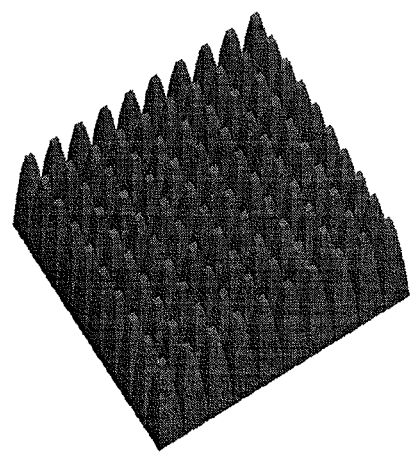
FIG. 4 is a three-dimensional depiction of one embodiment of an array of optical elements.

FIG. 4 illustrates one embodiment of an optical element array (also referred to as an optical element layer). The optical element array here is a 10×10 element array (100 total elements). However, in other embodiments, an optical element array can be of any desired size or include any desired number or arrangement of optical elements.

In alternative embodiments (not shown), the optical elements are arranged in a variety of patterns. For example, the optical elements may be repeated in parallel and spaced across the area of the film. The optical elements may be arranged in varying shapes, heights, angles, or spacings before a pattern is repeated. Alternatively, the optical elements may be arranged randomly so that there is no discernable pattern. Occasional variation in structure, or what might be termed disruptive structures, may be used to eliminate or reduce effects of unwanted aberrations (such as Moirè effects).

In one embodiment, the optical layer is formed from a highly transmissive polymer with an index of refraction exceeding that of air (index of refraction approximately 1). In one embodiment, the index of refraction for the polymer used to form the light containing region of the optical element is at least about 1.1, or even at least about 1.2. In another embodiment, the index of refraction for the polymer used to form the light containing region of the optical element is in the range of about 1.3 to about 1.8. This region is surrounded by any compatible material—for example, air or a polymer of lower index of refraction than the light containing region—that allows total internal reflection (TIR) at the internal boundary (the boundary internal to the device) of the light containing region. The lower the index of refraction of the polymer of the light containing region of the optical element, the smaller the Fresnel losses at the external air boundary of the input and output ends. This process of improved gain with lower index of refraction is limited only by the requirement to find a compatible material of low enough index of refraction to allow TIR at the internal boundary.

Figure 5B:
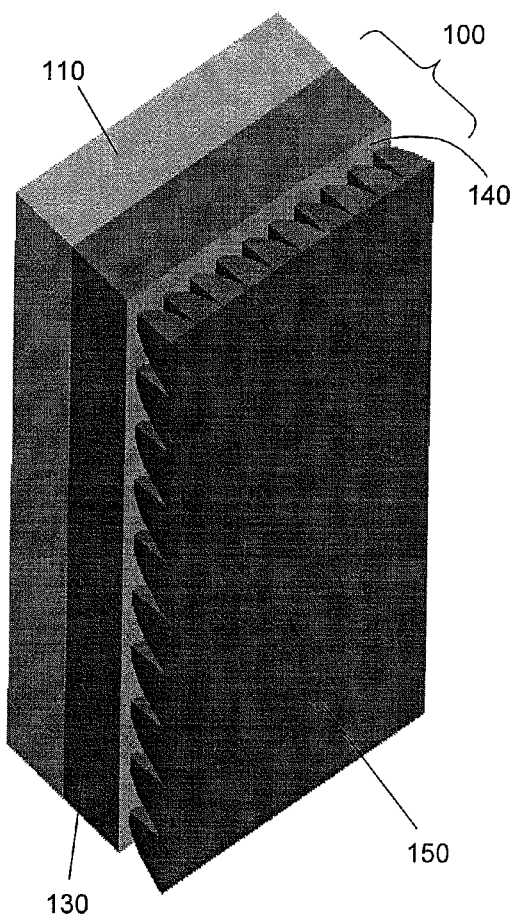
FIGS. 5A, 5B, and 5C illustrate one embodiment of a light collimating or funneling structure 100.
Figure 5A:
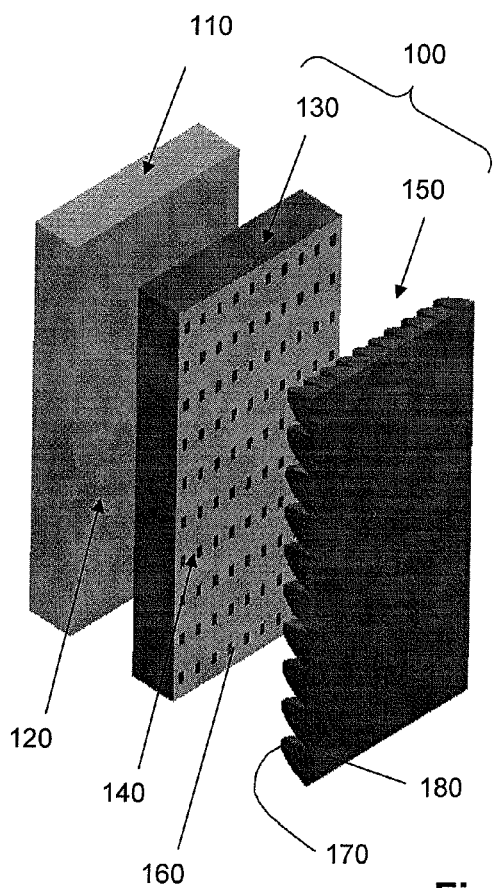
Figure 5C:
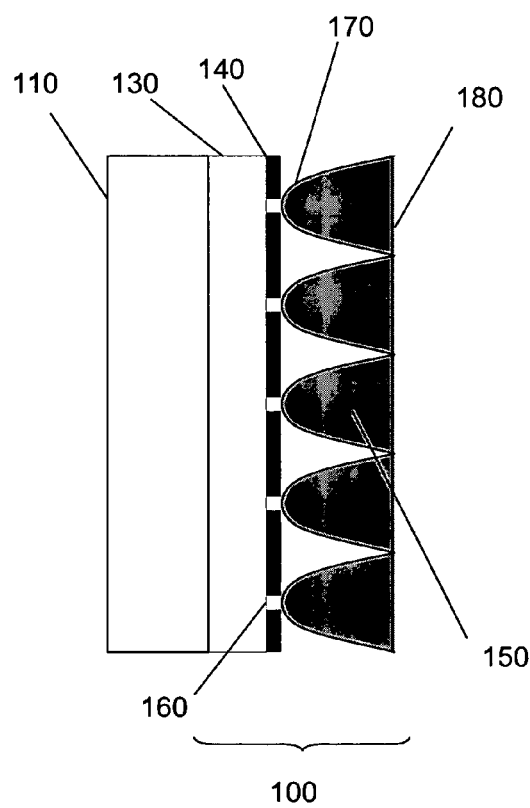

FIGS. 5A, 5B, and 5C show exploded, assembled, and side (the equivalent of a vertical plane cross section) views, respectively, of a light collimating or funneling structure 100. Also shown in FIGS. 5A, 5B, and 5C is a backlight 110 (such as one that is used in a LCD TV) having a surface 120 that simultaneously acts as an emitting and reflecting surface. Anyone familiar with the state of the art will recognize that this is a standard feature in LCD backlights. The reflecting feature allows for light recycling, a property that is necessary for performance. The collimating or funneling structure 100 includes an immersing layer 130 with a reflecting layer 140 formed thereon and an optical element layer 150.

In one embodiment, the immersing layer 130 is constructed of a polymeric material. Minimizing Fresnel losses requires an optically transparent material of the same index of refraction as the light containing region of the device. In another embodiment, any optically transparent material of any index of refraction can be used, including glass or air. If air is used, the reflecting layer 140 is deposited directly on the optical element layer 150.

The reflecting layer 140 includes apertures (or openings) 160 which match light input sides 170 of optical elements in the optical element layer 150. In one embodiment, the reflecting layer 140 is created by sputtering or chemically vapor depositing (CVD) a thin film of several microns of highly reflecting material onto a highly transmissive polymer substrate (the immersing layer 130 and selectively removing reflecting material at the location of the light input sides 170. The apertures 160 in the reflecting layer 140 can also be created by extending the material of the light input sides 170 and piercing through the reflecting layer 140. In one embodiment, the input apertures are in the same plane as the top of the reflecting layer. In this embodiment, the reflecting layer 140 is constructed of metal, such as nickel, gold, aluminum, silver, or other suitable metal. However, in other embodiments (not shown), the reflecting layer may be constructed of any reflecting substance.

The highly transmissive polymer substrate used to construct the immersing layer 130 may be the same polymer used in the optical elements in the optical element layer 150. The use of the same polymer would allow an optically seamless interface with the rest of the collimating or funneling structure and minimize Fresnel losses. In the case where the reflecting layer 140 acts as a specular or diffuse scattering layer, the reflecting layer 140 has as high a reflectivity as possible, with specular or diffuse reflection in the one embodiment in excess of 95%. The excess reflective material, the reflective material that would block the input to the light-containing region of the device, may be removed by, for example, masking and etching, so that the areas without reflecting material form the apertures 160. As noted above, the reflecting layer 140, with apertures 160 formed therein, can be located on either side of the immersing layer 130, so long as there is at least one reflecting layer 140 facing the backlight 110.

Here, the reflecting layer 140 acts as a thin, specularly or diffuse reflecting layer that allows the light from the source to be recycled by reflection. In an alternative embodiment, the reflecting layer 140 is a diffuse reflecting layer rather than a specular reflecting layer. However, the preferred embodiment is for a specularly reflecting layer 140 because ray-tracing calculations show a decline in performance of a diffuse reflecting layer, relative to a specularly reflecting layer. In yet another alternative embodiment, the surface of the reflecting layer 140 is textured (with, for example, systematic or random depressions or elevations, such as dimples) to guide the light into the input apertures more efficiently, that is with a minimum number of reflections and minimum energy lost. The reflective surface of the LCD backlight reflector can also be optically tuned to match the reflective layer of the device with the same goal of minimizing the number of reflections while guiding the light into the input apertures.

With continued reference to FIGS. 5A, 5B, and 5C, the reflecting layer 140 is disposed on the side of immersing layer 130 opposite from the backlight 110. In an alternative embodiment (not shown), the reflecting layer 140 is disposed on the side of the immersing layer 130 that faces the backlight 110. In either embodiment, the reflecting layer 140 reflects light towards the backlight 110 for recycling.

In this embodiment, the collimating or funneling structure 100 includes an optical layer 150 formed from a plurality of three-dimensional optical elements having a light input side 170 and a light output side 180. In the embodiment illustrated in FIGS. 5A, 5B, and 5C, the optical elements are joined together to form a sheet at their light output sides 180, thereby yielding a continuous collimating film. In an alternative embodiment, shown in FIG. 6, the light containing region of the optical elements are discrete and detached from each other, but are joined in a common polymer sheet 185.

In the embodiment illustrated in FIGS. 5A, 5B, and 5C, the light input side 170 of the optical element layer 150 is in contact with the reflecting layer 140, such that the optical elements of optical layer 150 correspond to the apertures 150 formed in the reflecting layer 140. In an alternative embodiment, shown in FIG. 6, the optical elements of the optical element layer 150 extend to embed the reflecting layer 140. In other words, the light input side 170 extends into the apertures 160 of the reflecting layer 140 and contact the immersing layer 130. In this embodiment, there is no gap between the immersing layer 130 and the optical element layer 150. This may be achieved by manufacturing the immersing layer 130 and the optical element layer 150 as a single continuous layer, and later joining (for example, laminating) the reflecting layer 140 onto the optical element layer 150.

In another alternative embodiment (not shown), the reflecting layer 140 is formed on the side of the immersing layer 130 facing the backlight, and the light input side 170 of the optical elements is in contact with the immersing layer 130.

Regardless of the positioning of the reflecting layer 140 in relation to the immersing layer 130, the reflecting layer 140 faces the backlight 110. The light emitted from the backlight 110 must eventually pass through the aperture 160 in the reflecting layer 140 and subsequently through the optical elements of the optical layer 150 in order to be collimated. Light not passing through an aperture 160 is reflected back to the backlight 110, which subsequently reflects the light back towards apertures. The light is then repeatedly reflected until it either passes through an aperture 160, or is lost to the system by absorption. The exit angular distribution of the collimated light may be designed so as to match the range of pixel acceptance angles found in different LCD display types. This would maximize the amount of light incident on the pixel that could be processed by the LCD, thereby maximizing the luminance perceived by an observer.

In one type of transflective LCD, additional light recycling can occur between the structure 100 and light reflected from the backside of a reflective portion of a pixel and recycled. This type of transflective LCD is constructed of pixels containing both a transmissive aperture and a reflective region. In another type of transflective LCD, the pixel is transmissive and the reflective region is located on an optical element exterior to the pixel. The major difference between such a transflective LCD and a transmissive LCD is the reflective region located on an optical element exterior to the pixel. The transmissive LCD could include the collimating device disclosed herein.

Figures 7A, 7B:
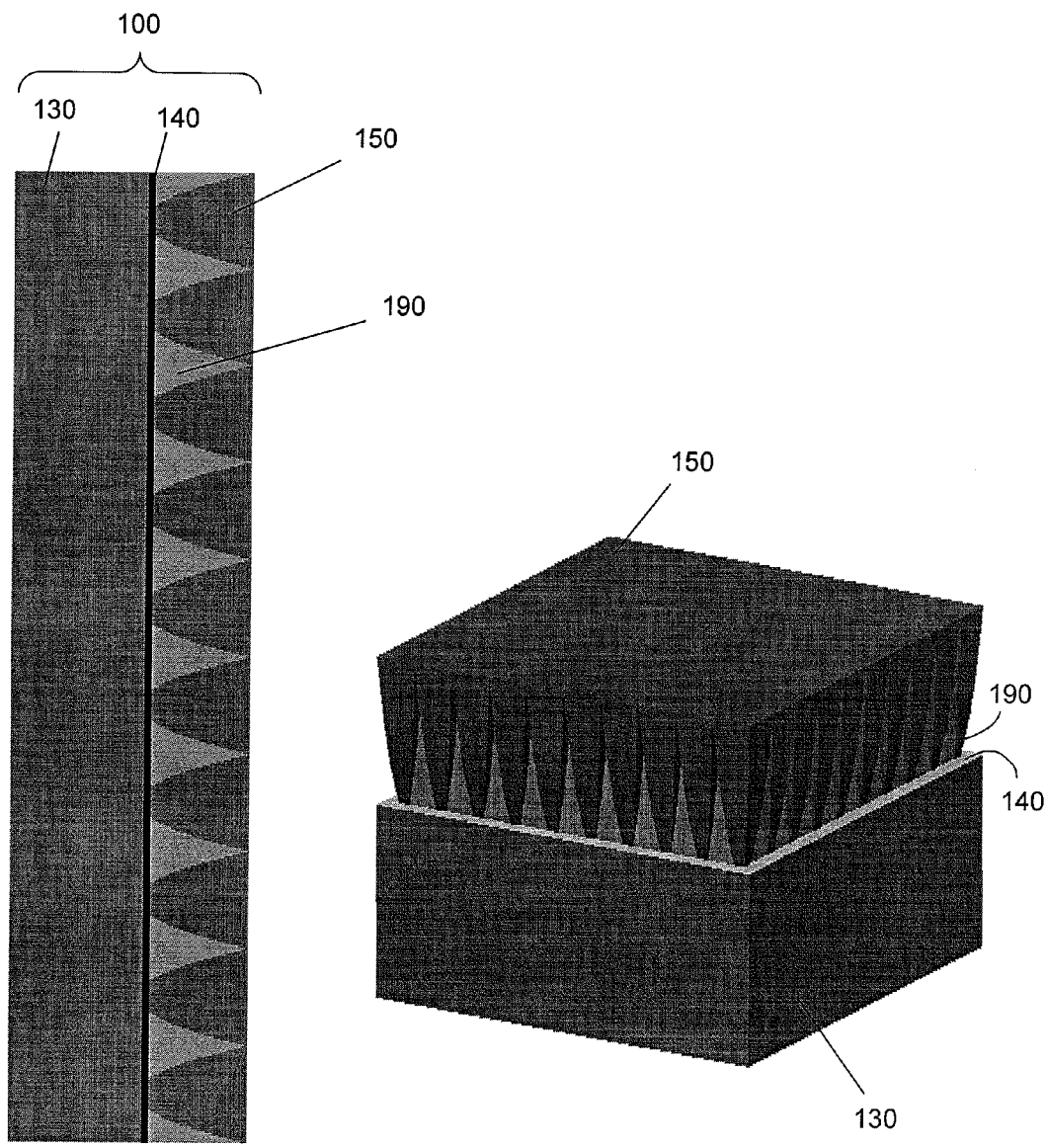
FIGS. 7A and 7B illustrate another embodiment of a light collimating or funneling structure 100.

FIGS. 7A and 7B illustrate another embodiment of a light collimating or funneling structure 100, in which the air space between the optical elements of the optical element layer are filled with a fill material 190. In this embodiment, the fill material 190 is constructed of a polymeric material having an index of refraction that is sufficiently lower than the highly transmissive polymer used for the optical elements. The difference in indices of refraction of the polymers may be selected to maintain TIR (total internal reflection). The difference in index of refraction of the regions necessary to maintain TIR decreases as the index of refraction of the light-containing region increases. The transmissivity of the fill material 190 does not need to be high since no light passes through the material. In fact, since the transmissivity of the fill material 190 could be zero, metal could be used as a fill material 190. The reflectivity of the metal must be sufficiently high to minimize energy loss (due to absorption or scattering by the metal) upon reflection of light from the boundary of the light-containing region. Since the surface between the input apertures of the light containing region must be covered by a reflecting material that allows for recycling of the light from the light source, using a polymer fill material 190 instead of air creates a surface for the reflecting material. A manufacturing method may allow for creating the reflecting surface 140 by deposition through a mask or by etching. A polymer immersing layer 110 may still be used to limit Fresnel losses. This embodiment is shown in FIGS. 7A and 7B, with identical reference numerals used therein denoting identical portions of the light collimating or funneling structure 100 as discussed in relation to FIGS. 5A, 5B, and 5C. As such a discussion of the complete structure 100 disclosed in FIGS. 7A and 7B will be omitted for brevity.

In one embodiment, the index of refraction of the optical element layer 150 is greater than the index of refraction of the fill material 190. The index of refraction of the optical element layer 150 is sufficiently greater than the index of refraction of the fill material 190 to allow TIR at the internal boundary (the boundary internal to the device) of the light-containing region without light leakage from the light-containing region. This difference is calculated to be about 0.15, with higher required values for differences related to a lower index of refraction for the optical elements and a smaller required values of differences related to a higher index of refraction. It should be noted that there is no upper limit on the difference between the indices of refraction between the polymer occupying/filling the air spaces and the polymer used to form the optical element layer 150, so long as the minimum difference to create TIR without leakage mentioned above is met.

Figure 8:
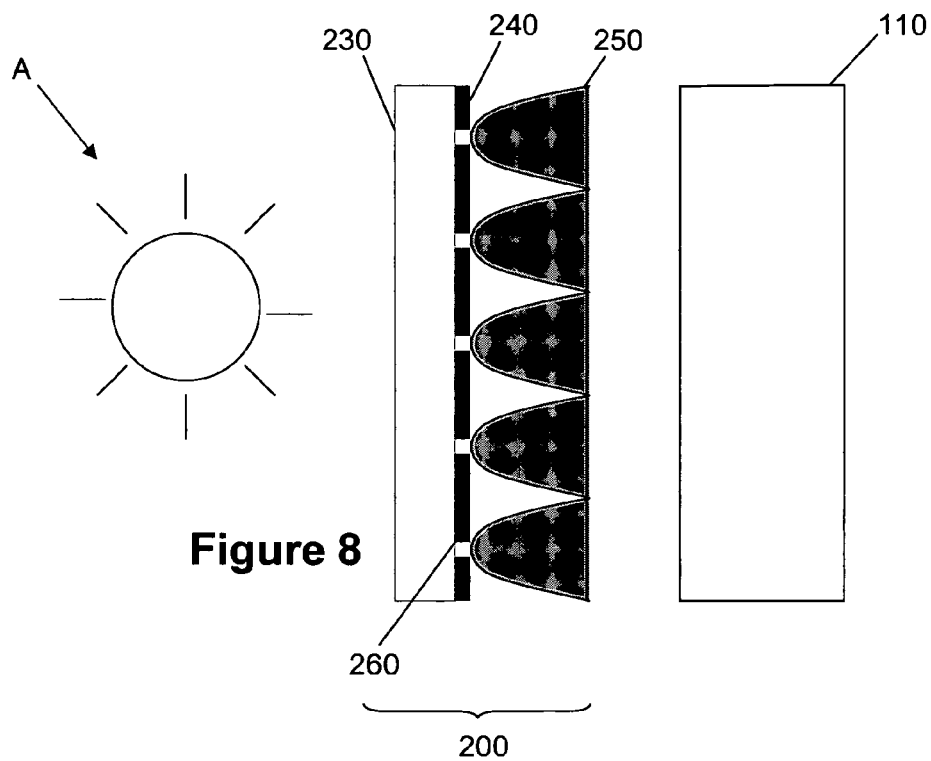
FIG. 8 is one embodiment of a transflective structure 200.

FIG. 8 illustrates a transflective structure 200 according to another embodiment of the present application. The transflective structure 200 reflects light that arrives from a first direction (i.e. from an ambient light source A, such as the sun or a room light) and transmits light that arrives from an opposite direction (i.e. from a backlight 110). In this embodiment, the transflective structure 200 may be formed of an immersing layer 230, an optical layer 250, and a reflecting layer 240 that covers the surface of optical element 250 excluding only the output aperture 260 and intended to maximize the reflecting area. The components of the transflective structure 200 are substantially the same as those used in the light collimating or funneling structure 100, but they are reversed.

In the embodiment illustrated in FIG. 8, the transflective structure 200 is positioned between a backlight 110 and an ambient light source A. The reflecting layer 240 may have apertures (or openings) 260 formed therein to transmit light from the backlight 110 while reflecting light from the ambient light source A. In FIG. 8, the reflecting layer 240 is formed on the side of the immersing layer 230 that faces the optical layer 250. Alternatively, the reflecting layer 240 may be formed on the side of the immersing layer 230 that faces the ambient light source A or it may be formed on both sides of the immersing layer 230. The structure and properties of the immersing layer 230 and the reflecting layer 240 are otherwise substantially similar to that of the immersing layer 130 and the reflecting layer 140 described above in relation to the light collimating or funneling structure 100. As such, a discussion of the complete structure and properties of the immersing layer 230 and the reflecting layer 240 disclosed in FIG. 8 will be omitted for brevity.

Figure 6:
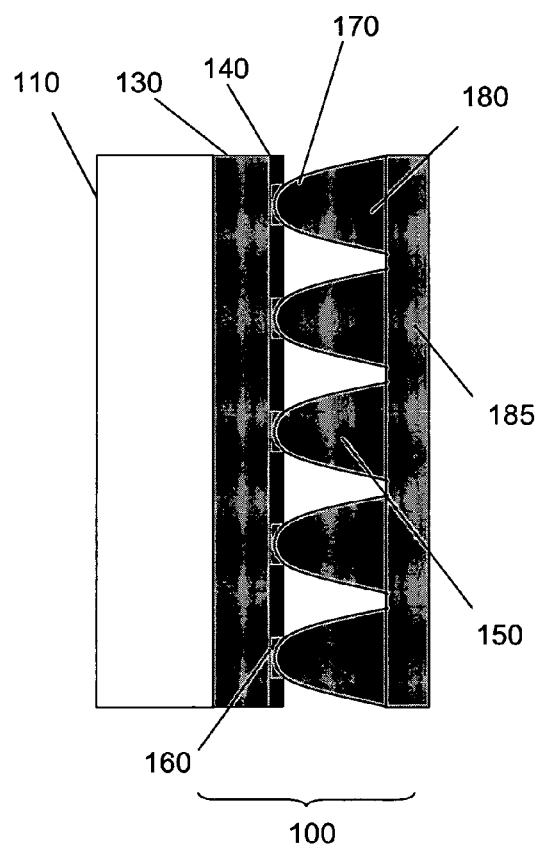
FIG. 6 is another embodiment of a light collimating or funneling structure 100.

The optical layer 250 may be formed of three dimensional tapered optical elements such as those shown in FIGS. 1A, 1B, 2A, 2B, 2C and 3. In this embodiment, the small area ends of the optical elements face the ambient light source A, and thus function as light output ends for light transmitted from the backlight 110. The light output ends of the optical elements of optical layer 250 corresponds to the apertures 260 formed in the reflecting layer 240. In this embodiment, the light output ends extend to contact the reflective layer 240. In an alternative embodiment, the light output ends extend to embed the reflecting layer 240, as shown in FIG. 6. In another alternative embodiment, the reflective layer 240 is formed on the side of the immersing layer 230 opposite the optical layer 260 and the light output ends of the optical elements contact the immersing layer 230.

The structure and properties of the optical layer 250 are otherwise substantially similar to that of the optical layer 150 described above in relation to FIGS. 5-7. As such, a discussion of the complete structure and properties of the optical layer 260 disclosed in FIG. 8 will be omitted for brevity.

Figure 9:
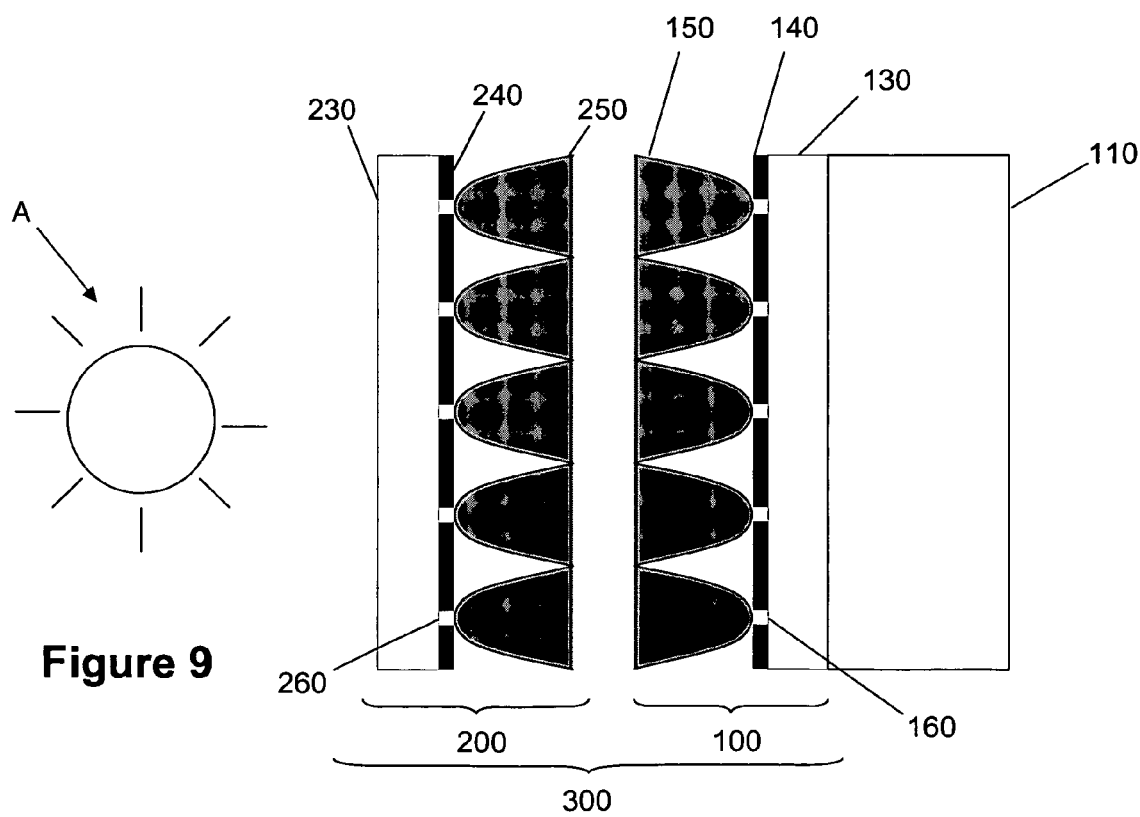
FIG. 9 is one embodiment of a transflector 300 having both a light collimating or funneling structure 100 and transflective structure 200.

FIG. 9 illustrates a transflector 300 having both a transflective structure 200 and a light collimating or funneling structure 100. The transflector 300 reflects light that arrives from a first direction (i.e. from an ambient light source A, such as the sun or a room light) and transmits light that arrives from an opposite direction (i.e. from a backlight 110). In the illustrated embodiment, a light collimating or funneling structure 100 is positioned between the backlight 110 and a transflective structure 200, so that light emitted from the backlight 110 is first collimated or funneled by the light collimating or funneling structure 100 and is then transmitted through the transflective structure 200. At the same time, ambient light is reflected off the reflecting layer 240.

In an alternative embodiment (not shown), the transflective structure 200 is positioned between the backlight 110 and the light collimating or funneling structure 100, so that light emitted from the backlight 110 is first transmitted through the transflective structure 200 and then is collimated or funneled by the light collimating or funneling structure 100 while ambient light is reflected off the reflecting layer 140. The light collimating or funneling structure 100 and the transflective structure 200 are substantially the same as those discussed in relation to FIGS. 5-7. As such, a discussion of the complete light collimating or funneling structure 100 and transflective structure 200 disclosed in FIG. 9 will be omitted for brevity.

FIG. 10A illustrates a display employing transflective pixels 270 and an optical layer 250 of a transflector 200. In the embodiment illustrated in FIG. 10A, the transflective pixels 270 have a reflective layer 275. The transflective pixels 270 are aligned with the light output ends of the light containing regions of the optical layer 250. Because the pixels 270 include a reflective layer 275, the transflector 200 has no need for a reflective layer. In this embodiment, the transflective pixels 270 are located in a liquid crystal suspension 280. Color filters 285 are also located in the liquid crystal suspension 280. The color filters 285 are aligned with the transflective pixels 270 and include red, green, and blue color filters.

With continued reference to FIG. 10A, a backlight 110 is located adjacent a rear polarizer 290. The optical layer 250 of a transflector 200 is positioned between the rear polarizer 290 and the liquid crystal suspension 280. The liquid crystal suspension 280 is also adjacent a front glass 295. The front glass is also adjacent a front polarizer 297. Because the pixels 270 include a reflective layer 275, the transflector 200 has no need for a reflective layer. In an alternative embodiment (not shown), a rear glass is disposed between the transflector 200 and the liquid crystal suspension 280. In another alternative embodiment (not shown), the transflector 200 is positioned behind the front polarizer 297.

FIG. 10B illustrates another alternative embodiment of a display employing transflective pixels 270 and the optical layer 250 of a transflector 200. In this embodiment, the color filters 285 are not located in the liquid crystal suspension 280. Instead, the color filters are disposed between a rear polarizer 290 and a rear glass 299. The optical layer 250 of a transflector 200 is located adjacent the backlight 110, such that it is disposed between the backlight 110 and the rear polarizer 290. The rear glass 299 is disposed between the color filters 285 and the liquid crystal suspension 280. A front glass 295 is disposed between a front polarizer 297 and the liquid crystal suspension 280, as in FIG. 10A.

FIG. 11A illustrates a display employing transflective pixels 270, a collimating device 100, and an optical layer 250 of a transflector 200. In the embodiment illustrated in FIG. 11A, the transflective pixels 270 have a reflective layer 275. The transflective pixels 270 are aligned with the light output ends of the light containing regions of the optical layer 250. Again, because the pixels 270 include a reflective layer 275, the transflector 200 has no need for a reflective layer. The collimating device 100 includes an optical element layer 150 and a reflecting layer 140 having apertures 160. In this embodiment, the transflective pixels 270 are located in a liquid crystal suspension 280. Color filters 285 are also located in the liquid crystal suspension 280. The color filters 285 are aligned with the transflective pixels 270 and include red, green, and blue color filters.

With continued reference to FIG. 11A, a backlight 110 is located adjacent a rear polarizer 290. The collimating device 100 is adjacent the rear glass 290, such that the rear glass is disposed between the backlight 110 and the collimating device 100. The optical layer 250 of a transflector 200 is positioned between the collimating device 100 and the liquid crystal suspension 280. The liquid crystal suspension 280 is also adjacent a front glass 295. The front glass is also adjacent a front polarizer 297. In an alternative embodiment (not shown), a rear glass is disposed between the transflector 200 and the liquid crystal suspension 280. In an alternate embodiment (not shown), the transflector 200 and collimating device 100 are separated and the collimating device 100 is positioned behind the front polarizer 297. In another alternate embodiment (not shown), both the transflector 200 and collimating device 100 are positioned behind the front polarizer 297.

FIG. 11B illustrates another alternative embodiment of a display employing transflective pixels 270 and the optical layer 250 of a transflector 200. In this embodiment, the color filters 285 are not located in the liquid crystal suspension 280. Instead, the color filters are disposed between a rear polarizer 290 and a rear glass 299. The collimating device 100 is located adjacent the backlight 110, such that it is disposed between the backlight 110 and the optical layer 250 of a transflector 200. The rear polarizer 290 is disposed between the optical layer 250 of a transflector 200 and the color filters 285. The rear glass 299 is disposed between the color filters 285 and the liquid crystal suspension 280. A front glass 295 is disposed between a front polarizer 297 and the liquid crystal suspension 280, as in FIG. 11A. In another alternate embodiment (not shown), the transflector 200 and collimating device 100 are separated and the transflector 200 is positioned in front of the front polarizer 297 but behind the color filters 285.

The collimating or transflecting device, or combination thereof, may be used as part of the backplane of an LCD. Locating the transflective device in the backplane would alleviate both color shifts and parallax effects arising from the reflective (ambient) component. This should be particularly applicable in flexible (so called plastic) displays.

Figure 12:
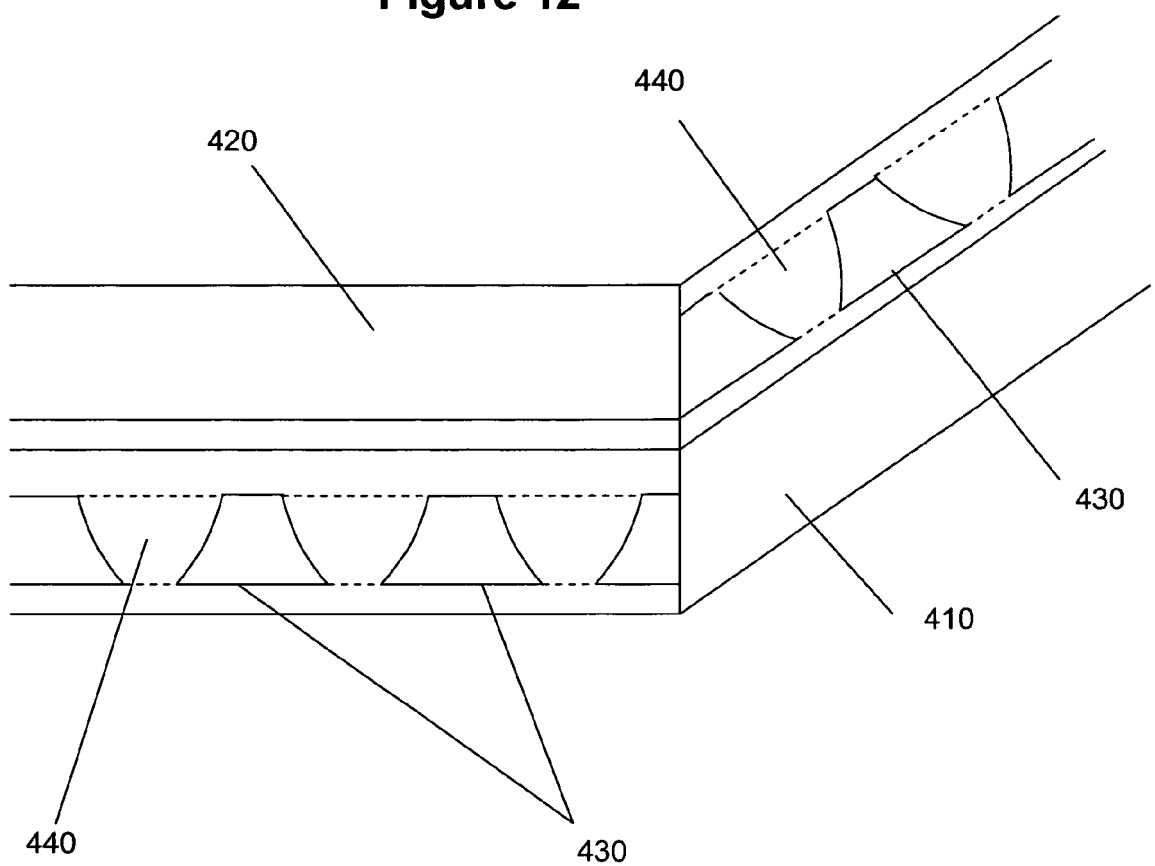
FIG. 12 is a three-dimensional depiction of one embodiment of a light collimating or funneling structure 400 having two layers, wherein each layer is composed of optical elements that are lenticular channels whose vertical plane cross-section is four-sided (including, for example, a trapezoid or a figure with curved sides) and whose horizontal plane cross-section is a rectangle with length equal to that of the lenticular channel.

FIG. 12 illustrates one embodiment of a light collimating or funneling device 400 having first and second optical element layers 410, 420 with light funneling or collimating element 440. In this embodiment, each optical element layer 410, 420 is formed from optical elements that are lenticular channels whose vertical plane cross-section is four-sided (including, for example, a trapezoid or a figure with curved sides) and whose horizontal plane cross-section is a rectangle with length equal to that of the lenticular channel. As disclosed in earlier figures, the optical elements in both layers are tapered towards a backlight (not shown).

In this embodiment, the optical element layers 410, 420 are arranged so that the lenticular channels are positioned orthogonal to each other. In other words, the horizontal plane rectangular bases of the optical elements in the first optical element layer 410 are orthogonal to the horizontal plane rectangular bases of the optical elements in the second optical element layer 420. In an alternative embodiment (not shown), the lenticular channel of the first optical element layer 410 are placed at an acute or obtuse angle with respect to the lenticular channels of the second optical element layer 420. In one embodiment, the second optical element layer 420 (the layer farthest from the backlight) includes a metal layer 430. In an alternative embodiment (not shown), the upper layer does not include a metal layer. In an additional alternative embodiment (not shown), the structure 400 includes a single layer of optical elements having rectangular cross-sections.

The structure 100, 200, 300, or 400 may be used with, for example, a non-emissive display system, such as a liquid crystal display (LCD), or other devices in which light is directed for the purpose of creating an image. A typical non-emissive display system of this type includes a stack comprised of a backlight, a polarizer, a liquid crystal suspension, and another polarizer. On occasion, glass plates may be layered in between each polarizer and the liquid crystal suspension. The structure 100, 200, 300, or 400 may be positioned between the backlight and the polarizer. In operation, ambient light will pass through the various layers of polarizers, glass plates (which may include color filters, common electrodes, TFT matrix, or other components), and liquid crystal suspension and will be redirected by reflective structures located on the inside of the back glass plate of the liquid crystal while at the same time artificial light rays generated from a backlight assembly will pass through the structure 100, 200, 300, or 400. The structure 100, 200, 300, or 400 may also be included as part of a sub-assembly of an LCD or may be used in combination or conjunction with other recycling films such as collimating or reflective polarizing films.

The structure 100, 200, 300, or 400 may be inserted between the backlight assembly and the liquid crystal module where the reflective surface or surfaces of the structure 100, 200, 300, or 400 faces the backlight assembly and the transmissive surface faces the liquid crystal module.

The typical distribution of light from an LCD backlight is Lambertian. Such a distribution is considered uncollimated. The structure 100, 200, 300, or 400 collimates the Lambertian distribution of the backlight to a prespecified angle of distribution. The prespecified angular distribution depends on the index of refraction of the light-containing polymer region, the length and shape of the light containing region, and the size of the input and output apertures. The reflective surface of the structure 100, 200, 300, or 400 may face the backlight assembly with light coming out of the backlight assembly and passing through the openings in the reflective surface to be eventually processed by the liquid crystal module.

Since space is usually at a premium inside an LCD, the overall thickness of the structure 100, 200, 300, or 400 should be minimized. In one embodiment, the overall thickness of the device may be less than about 1000 microns, less than about 500 microns, or even less than about 200. In another embodiment, the structure 100, 200, 300, or 400 is not limited to any pre-defined thickness. Rather, the thickness of the structure 100, 200, 300, or 400 is determined by its use and is not necessarily limited to 1000 microns. Likewise, the choice of periodicity is influenced by the LCD pixel periodicity. If periodicities for the device are smaller than the periodicities for the LCD, manufacturing defects in the device are less likely to be visible and result in rejection. Typical periodicities for the device could range from the sub-micron range to hundreds of microns. Typical input aperture widths also range from sub-microns to hundreds of microns. Special care must be taken when using sub-micron designs to deal with potential diffraction effects. Based on this range of possible designs, both nanoreplication and microreplication methods are likely to be used in manufacturing the device. Performance will be maintained when structure features are properly scaled.

In another embodiment, a structure 100, 200, 300, or 400 can be positioned within a liquid crystal module itself in three configurations: (1) at the back (surface) of the rear glass of the liquid crystal module and in front of the polarizer, (2) at the back (surface) of the rear glass of the liquid crystal module and behind the polarizer, or (3) inside the rear glass of the liquid crystal module at the pixel level. For a two-polarizer liquid crystal display system, only the second configuration is possible for the display to process the light. For a single polarizer liquid crystal display system, all three configurations are possible. In a plastic LCD the structure 100, 200, 300, or 400 may be incorporated as part of the backplane and not necessarily limited to 1000 microns. Likewise, the choice of periodicity is influenced by the LCD pixel periodicity. If periodicities for the device are smaller than the periodicities for the LCD, manufacturing defects in the device are less likely to be visible and result in rejection. Typical periodicities for the device could range from the sub-micron range to hundreds of microns. Typical input aperture widths also range from sub-microns to hundreds of microns. Special care must be taken when using sub-micron designs to deal with potential diffraction effects. Based on this range of possible designs, both nanoreplication and microreplication methods are likely to be used in manufacturing the device. Performance will be maintained when structure features are properly scaled.

The LCD can be manufactured on a roll-to-roll or assembled-by-layer basis for any of the embodiments described and the light collimating or funneling structure 100, 200, 300, or 400 can be an integral part of the stack. The layers of the LCD stack are produced or assembled on a layer-by-layer basis, and the structure 100, 200, 300, or 400 can be incorporated as a part of the glass, pixel, collimator, or polarizer. Functional components may be layered on a liquid crystal module substrate, thereby permitting the structure 100, 200, 300, or 400 to be constructed as part of the overall liquid crystal module manufacturing process.

In one embodiment, a non-emissive display system may collimate light such that the majority of light emerges perpendicular to the device. The non-emissive display system may also include a light polarizer. In any embodiment, the collimating or polarizing material may be attached to the reflective or transmissive side of the device. The highly transmissive surface of the structure 100, 200, 300, or 400 may face the liquid crystal module and the highly reflective surface may face the backlight assembly. The collimating or polarizing material can be attached to the entire transmissive surface of the structure 100, 200, 300, or 400. The collimating or polarizing materials may be an integrated design element and part of the manufactured product. Alternatively, the material may be later adhered or fixed to either surface of the structure 100, 200, 300, or 400. In one embodiment, the collimating film may cover the entire area of the surface where the light emerges from the structure 100, 200, 300, or 400. The collimating film may cover the full area of the display or at least a portion thereof.

Another way to collimate light is to include lens-lets within the liquid crystal display system. The location could be either an integral with the structure 100, 200, 300, or 400 or separate from it, the location of the lens-lets may be directly above or underneath the structure 100, 200, 300, or 400.

The optical elements described herein have the ability to allow light to pass from the backside, while the front surface of the film can potentially be used to absorb, direct, reflect, or deflect the ambient light. A modification of the transflective film can be used in an Organic Light Emitting Diode (OLED) display. Take the original transflective design and replace the upper reflective metal area with light absorbing or directing material. The film sits between the OLED pixels (light source) and the top glass. This controls the effect of ambient light (effectively unwanted glare) in the emissive OLED display. There is also a traditional (non-OLED) transmissive LCD application that would benefit from this design. This design to control glare and improve contrast can be used with any emissive display. This design, as in the transflective design, could be deployed as a film or as a component of the pixel surface.

There are at least four methods of microreplication manufacturing for the above-described devices. The first method involves creation of a master mold and then the creation of the device. The master mold can be manufactured utilizing a diamond turning process or a photolithographic process (including any part of the electromagnetic spectrum such as X-ray lithography for LIGA as an example). To create the repeated structures of the device, a mechanical process such as embossing or molding or a chemical process such as etching can be utilized. Thus, utilizing these processes, the structures may be formed in the body of a transparent film material, glass, or plastic substrate by creating indentations (voids) in the transparent material. Light containing regions of the transparent material are then delineated by these indentations. Manufacturing techniques using transparent photosensitive materials where physical indentations are not formed will be described below.

The indentations may then be filled with either a reflective material or a material that has a lower index of refraction than that of the transparent film material. The indentations in the transparent film material may be embedded in the transparent film material such that the base of each shape is approximately parallel to and coincident with, or slightly recessed from, the transparent material. If the reflective fill material has a lower index of refraction than the transparent film material, light will be contained in the transparent material.

To accommodate either of these processes, the transparent film material has specific properties necessary for etching, molding, embossing, or other processes that alter the body of the device. Examples of suitable materials are polymers such as polycarbonate and PMMA (polymethylmethacrylate). Examples of reflective material for filling the indentations include a metal composite or other material with a high reflectivity such as aluminum, gold, silver, nickel, chrome, a dielectric or other metallic alloy with a reflectivity of 80% or greater. In one embodiment, the reflectivity of the material is 95% or greater. The fill material for the reflective structures will be optimized to minimize absorption and have highly reflective properties for the controlled redirection of energy. Examples of fill material that has a lower index of refraction than that of the transparent film material include clear composite paste, composite material (e.g., polymer), or multiple composite materials with different refractive indices or reflective qualities. In an alternative embodiment, no material (e.g., gas, air, or vacuum) may be used to fill the indentations.

The minimum difference in index of refraction between the fill and the body of the element is estimated to be 0.01 to achieve TIR of that portion such that light does not leak by refraction through the boundary of the light-containing region. The index of refraction difference may not be the same for each shape across the body of the device, as long as there is sufficient index of refraction difference between the fill and the body of the element so that some of the light undergoes TIR and does not leak out of the light-containing region. Preferably, however, the indices of refraction are the same for each shape across the body of the device. Furthermore, a portion of the indentations may be filled with a first material and then a second portion of the indentation may be filled with a second material. For example, the top of the indentation may be filled with aluminum while the rest of the indentation may be filled with a clear polymer having a lower index of refraction than that of the transparent film material.

A second method of manufacturing the above-described devices produces the structures in a transparent photosensitive film. The structures are produced by changing the index of refraction in specific areas of the body of the transparent photosensitive film to have the equivalent function and shape of the collimating or transflector structures herein described, wherein the function and shape may be the same.

As in the manufacturing technique using microreplication, the equivalent appropriate structures are created whereby the high index of refraction structures become the light-containing regions and the low index of refraction regions act as the light-guiding boundary regions. The process includes forming a transparent photosensitive film on the surface of a substrate (for example, by deposition). The transparent photosensitive film may be constructed of any clear material that, when exposed to light, changes its optical properties. The photosensitive material should exhibit favorable optical and mechanical properties. In addition to a sufficient photo-induced refractive index change, a suitable set of "writing" wavelengths (typically in the ultraviolet), optical transparency, thin film formability, and mechanical behavior are of great importance. The transparent photosensitive film may be "written" by scanning over the surface with a repeated pattern or over a larger volume through a micro-lenslet array.

Examples of materials used in this process include OLEDs or organic polymers that have optimized mechanical behavior, or organic-inorganic hybrids that combine the chemical versatility of organic polymers, i.e. polysilanes, polygermanes, and/or their sol-gel hybrids. Other materials include organic polymer such as specially modified polyethylene, polycarbonate, polyvinylcinnamate, and polymethylmethacrylate. Other materials include the combination a transparent polymer matrix and a polymerable photo-reactive substance comprising a photopolymerizable monomer. The transparent polymer matrix may be selected from the group consisting of polyolefins, synthetic rubbers, polyvinyl chloride, polyester, polyamide, cellulose derivatives, polyvinyl alcohol, polyacrylates, polymethacrylates, polyurethane, polyurethane acrylate, and epoxy acrylate resin. The photo-reactive substance comprises a photo-reactive initiator which has a refractive index regulating activity and said film has a distribution of a refractive index. The photopolymerizable monomer may be selected from the group consisting of tri-bromophenoxyethyl acrylate and trifluoroethyl acrylate.

A thin layer of reflective material is then deposited on the surface of the photosensitive transparent film opposite the substrate. In one embodiment, the reflective material for the thin layer of reflective metal is a metal composite or other material with a high reflectivity such as aluminum, gold, silver, nickel, chrome, a dielectric or other metallic alloy with a reflectivity of 80% or greater. Preferably, the reflectivity of the material is 95% or greater. Predetermined regions of the reflective metal deposition are then removed by ablating the reflective material to expose the photosensitive film in the predetermined regions. These predetermined regions are then exposed to a light source to change the optical characteristics of the photosensitive film in the predetermined regions to alter the index of refraction of the photosensitive film in the predetermined regions to thereby form altered refractive index areas. The steps of ablating the reflective metal and changing the optical characteristics of the photosensitive film are accomplished by a light source (that faces the metal reflective layer) that may produce ultraviolet light. The light source may comprise an optical radiation source that irradiates light, at a specific wavelength and of sufficient intensity, through a micro-lenslet array so as to ablate the reflective metal layer and change the optical characteristics of the photosensitive film. In one embodiment, the radiation source is an excimer laser.

The unchanged portions of the photosensitive film comprise unaltered refractive index areas (i.e., structures) having a lower index of refraction than the altered refractive index areas.

A third method of manufacturing also produces the desired structures in a transparent photosensitive film. The process also includes forming a transparent photosensitive film on the surface of a substrate. The transparent photosensitive film may be constructed of the same materials as discussed above. A photoresist layer is then formed on the photosensitive film. Predetermined regions of the photosensitive film and the photoresist layer are then exposed to a light source (that faces the substrate) to change the optical characteristics of the photosensitive film in the predetermined regions and to alter the index of refraction of the photosensitive film in the predetermined regions to thereby form altered refractive index areas in the photosensitive film.

The light source may comprise an optical radiation source that irradiates light, at a specific wavelength and of sufficient intensity, through a micro-lenslet array so as to ablate the reflective metal layer and change the optical characteristics of the photosensitive film. Preferably, the radiation source is an Excimer laser. The exposed photoresist layer in the predetermined region is then removed using a suitable etchant that creates an opening to the photosensitive film. A thin layer of reflective material is then deposited in the openings previously occupied by the exposed photoresist layer. In one embodiment, the reflective material for the thin layer of reflective metal is a metal composite or other material with a high reflectivity such as aluminum, gold, silver, nickel, chrome, a dielectric or other metallic alloy with a reflectivity of 80% or greater. In one embodiment, the reflectivity of the material is 95% or greater. Finally, the residual photoresist layer is washed away and lifted off, removing the unwanted material that was on the residual photoresist layer leaving the desired pattern on the remainder of the surface.

A fourth manufacturing method (or process) for creating the above-described devices includes a single step process of producing the desired structures in a transparent photosensitive film. In this method, CPC or approximate CPC structures are manufactured from a photosensitive polymer by exposing the output side of the structure to a laser light, using a lens/masking system. The photosensitive polymer reacts to the laser light in a pre-determined frequency band by changing its index of refraction in appropriately selected areas. A printing system is guided by the light output from the structures created by the change in index of refraction. Simultaneously then, a reflective layer surrounding the input apertures can be manufactured by printing a reflecting layer whenever there is no light. To complete the process, a simple blanket polymer deposition on the input aperture side is performed to immerse the reflecting layer.

In other embodiments related to utilizing a photosensitive transparent material, discrete structures may be arranged in varying structures, heights, angles, or spacing and one or more of the discrete faces of a structure, may be concave, convex, and/or pitted. Additionally, micro-shapes (such as pyramids or cones) may be deposited on one side of the body of the element directly over the base of each structure, either as part of a deposition process, described above, or as an independent process, to further control the direction of reflected energy. In other embodiments, the indices of refraction may be different for each discrete structure such that various alternating patterns are produced across the body of the element to achieve specific effects. In other embodiments, a combination of structures created by filled indentations and altering the refractive index of a photosensitive material may be used to create various patterns across the body of the element. In one embodiment, a reflective material such as metal or any material with the equivalent of an infinite index of refraction may be inserted underneath the polymer-cladding layer (layer of lower index of refraction material) to reflect light exceeding the cladding's index of refraction critical angle. This will reflect light normally lost by reflecting light back into the wave-guide region. This technique may be used for all structure sizes defined above.

Another method of creating the above described devices includes fabrication of structures from some suitable material that will maintain integrity in the physical working environment, and suspending the structures by some suitable method. Suspension may be accomplished by the use of wire or some type of filament that forms a grid, but will depend on the specific application and will be apparent to one skilled in the art. This aspect of the invention is useful in solar applications or other applications, where the size of transflectors may or may not be limited by the size requirements of non-emissive displays (where the intended use is by the human visual system).

Another method to manufacture light-guiding structures is to directly locate structures on top of a supporting surface such as glass or polymer. One preferred embodiment is an isosceles shaped light-guiding structure made of metal or a highly reflective material resting on glass. The wave guide structures are laid on top of or deposited on the underlying supporting surface. Another preferred embodiment is where the supporting surface contains periodic shapes (grooved or projection) wherein a fluid containing the appropriate mating pieces is passed over the periodic shapes of the supporting surface such that the probability of creating the desired device is 100%. This can be accomplished as in biological systems by having a sufficient number of the mating pieces carried in the fluid in excess of the shapes on the supporting structure.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's claimed invention.

The invention claimed is:

1. An optical layer having a light input side and a light output side, the optical layer comprising:
    a plurality of three-dimensional, light collimating elements,
    wherein each optical element has a light input end, a light output end, and a polygonal horizontal plane cross-section, and
    wherein each optical element is tapered, such that a vertical plane cross-section of the optical element includes at least one curved section that is an approximation of a compound parabolic concentrator and includes at least one linear section, such that uncollimated light entering the light input end of the optical element from multiple angles emerges from the light output end of the optical element as a substantially uniform sheet, wherein the curved section is defined by an arc of a circle, and a slope of the curved section matches a slope of the at least one linear section at the intersection point of the curved section and the at least one linear section.

2. A single, discrete element in an optical element layer for transmitting light, the single, discrete element comprising:
    a light input end having a polygonal shape;
    a light output end having a polygonal shape;
    a plurality of sides, tapered from the light output end to the light input end and configured to focus light such that substantially all light entering the light input end emerges fully collimated from the light output end, wherein each of the plurality of sides include at least one region that is a circular approximation of a compound parabolic concentrator and at least a first linear section and a second linear section, wherein the first linear section is adjacent the light output end, the second linear section is adjacent the light input end, and the circular approximation of a compound parabolic concentrator is located between the first and second linear sections.

3. An optical element layer for transmitting light, comprising:
    a plurality of light collimating elements, each having
    a light input end,
    a light output end, and
    a plurality of sides, tapered from the light output end to the light input end, each side including at least one section defined by an arc of a circle and at least one linear section, wherein the at least one section defined by an arc of a circle matches the slope of the at least one linear section at an intersection point of the at least one section defined by an arc of a circle and the at least one linear section, wherein each of the plurality of light collimating elements is configured to fully collimate light entering through the light input end and emerging from the light output end.

* * * * *